United States Patent
Kawamoto (10) Patent No.: US 9,781,691 B2
(45) Date of Patent: Oct. 3, 2017

(54) WIRELESS COMMUNICATION DEVICE, NON-TRANSITORY COMPUTER READABLE MEDIUM, AND WIRELESS COMMUNICATION SYSTEM

(71) Applicant: Oki Electric Industry Co., Ltd., Tokyo (JP)

(72) Inventor: Yasutaka Kawamoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 49 days.

(21) Appl. No.: 14/738,226

(22) Filed: Jun. 12, 2015

(65) Prior Publication Data

US 2016/0119888 A1  Apr. 28, 2016

(30) Foreign Application Priority Data

Oct. 23, 2014  (JP) ................. 2014-216569

(51) Int. Cl.
   *H04W 84/18*  (2009.01)
   *H04W 56/00*  (2009.01)
   *H04W 52/02*  (2009.01)
   *H04L 1/18*   (2006.01)

(52) U.S. Cl.
   CPC ..... *H04W 56/001* (2013.01); *H04W 52/0229* (2013.01); *H04L 1/18* (2013.01); *Y02B 60/50* (2013.01)

(58) Field of Classification Search
   None
   See application file for complete search history.

(56) References Cited

U.S. PATENT DOCUMENTS

| 2009/0130980 | A1* | 5/2009 | Palanki | H04W 52/241 455/63.1 |
| 2013/0023249 | A1* | 1/2013 | Stass | H04W 4/16 455/414.1 |
| 2013/0259016 | A1* | 10/2013 | Xhafa | H04W 84/18 370/338 |
| 2014/0010175 | A1* | 1/2014 | Chiu | H04W 72/042 370/329 |
| 2015/0236947 | A1* | 8/2015 | Kobayashi | H04L 45/20 370/254 |

OTHER PUBLICATIONS

IEEE Standard for Local and metropolitan area networks—Part 15.4: Low-Rate Wireless Personal Area Networks (LR-WPANs); Amendment 1: MAC sublayer IEEE Std 802.15.4e-2012.

* cited by examiner

*Primary Examiner* — Brandon Renner
(74) *Attorney, Agent, or Firm* — Rabin & Berdo, P.C.

(57) ABSTRACT

There is provided a wireless communication device including a reception timing sense unit configured to sense reception timing information, a reception timing storage unit configured to store the reception timing information and to disclose and delete the stored reception timing information, a frame group arrival confirmation unit configured to confirm that a frame group arrives, a first frame group transmission unit, a second frame group transmission unit, a third frame group transmission unit, and a frame group transmission control unit configured to select any of the first frame group transmission unit, the second frame group transmission unit, and the third frame group transmission unit on the basis of the reception timing information and a result of frame group arrival confirmation, and to control a frame group transmission operation.

10 Claims, 7 Drawing Sheets

WIRELESS COMMUNICATION DEVICE, NON-TRANSITORY COMPUTER READABLE MEDIUM, AND WIRELESS COMMUNICATION SYSTEM

CROSS REFERENCE TO RELATED APPLICATION(S)

This application is based upon and claims benefit of priority from Japanese Patent Application No. 2014-216569, filed on Oct. 23, 2014, the entire contents of which are incorporated herein by reference.

BACKGROUND

The present invention relates to a wireless communication device, non-transitory computer readable medium, and a wireless communication system. The present invention is applicable, for example, to a system in which wireless communication devices are autonomously synchronized with each other, decide communication timing, and transmit and receive data.

For example, a communication device (which will also be referred to as "node" below) included in a sensor network is configured to perform power-saving communication. Typical methods for power-saving communication include intermittently operating communication devices. For example, coordinated sampled listening (CSL) is a communication standard that adopts this intermittent operating method for communication devices (see IEEE802.15.4e).

A reception node R that performs communication in the CSL intermittently reaches a reception standby state at cycles set in advance (e.g. "reception for two milliseconds every three seconds," etc.).

First of all, a transmission node S that performs communication in the CSL successively transmits wakeup frames for a given period in transmitting a data frame. The wakeup frame includes information indicating "how milliseconds later a data frame is to be transmitted," or the like.

The CSL has two types of frame transmission methods: frame asynchronous transmission; and frame synchronous transmission. The frame asynchronous transmission is used when the transmission node S does not know the intermittent reception timing of the reception node R. Meanwhile, the frame synchronous transmission is used when the transmission node S knows the intermittent reception timing of the reception node R. Additionally, these two types of frame transmission method have different periods for which wakeup frames are successively transmitted.

Figure 6:
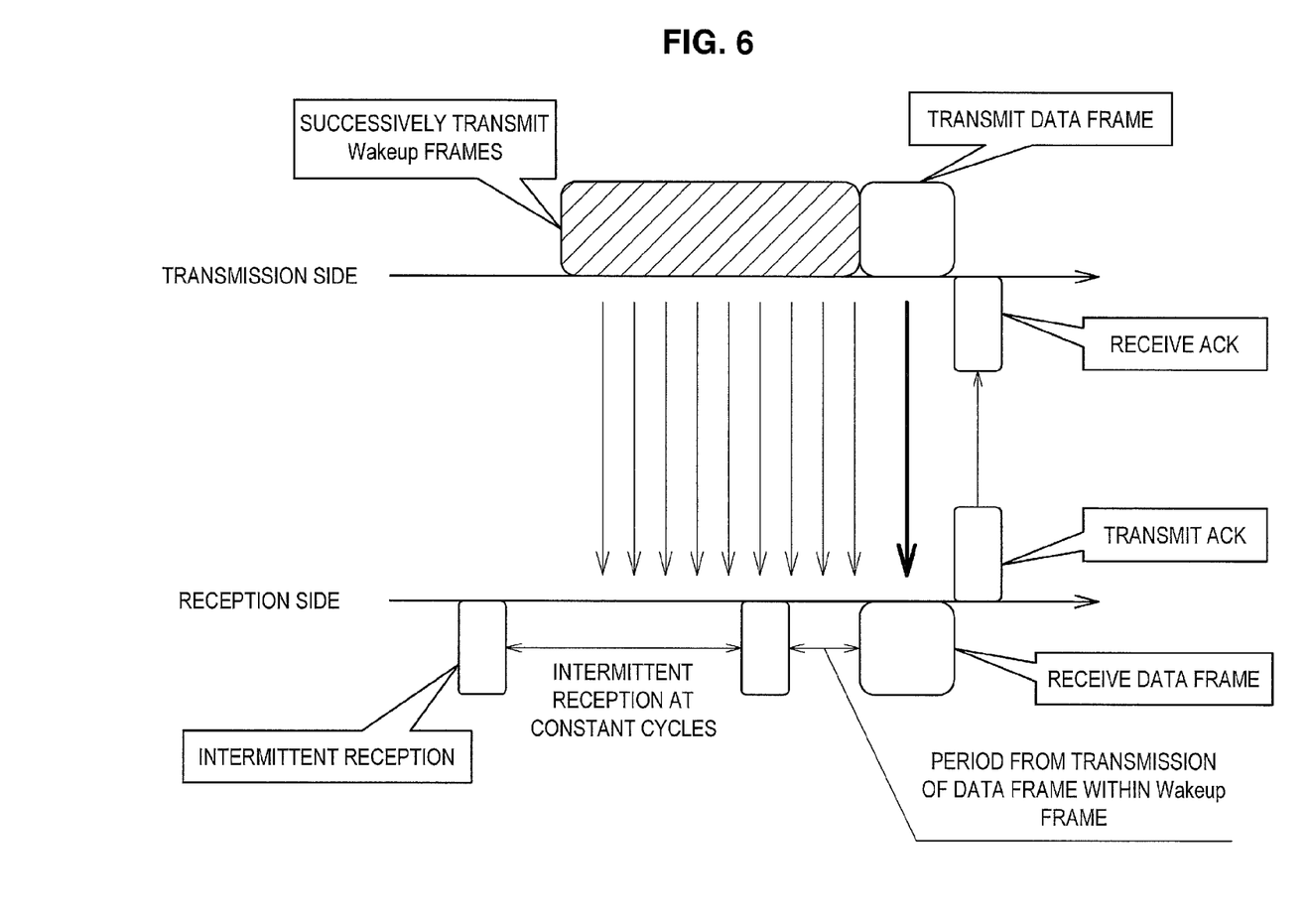
FIG. 6 is an explanatory diagram imaging communication with frame asynchronous transmission.

FIG. 6 is an explanatory diagram imaging communication with the frame asynchronous transmission.

If the frame asynchronous transmission is used, the transmission node S successively transmits wakeup frames for a long period before transmitting a data frame. The wakeup frame successive transmission period lasts as long as an intermittent reception period (such as three seconds) in most cases.

Figure 7:
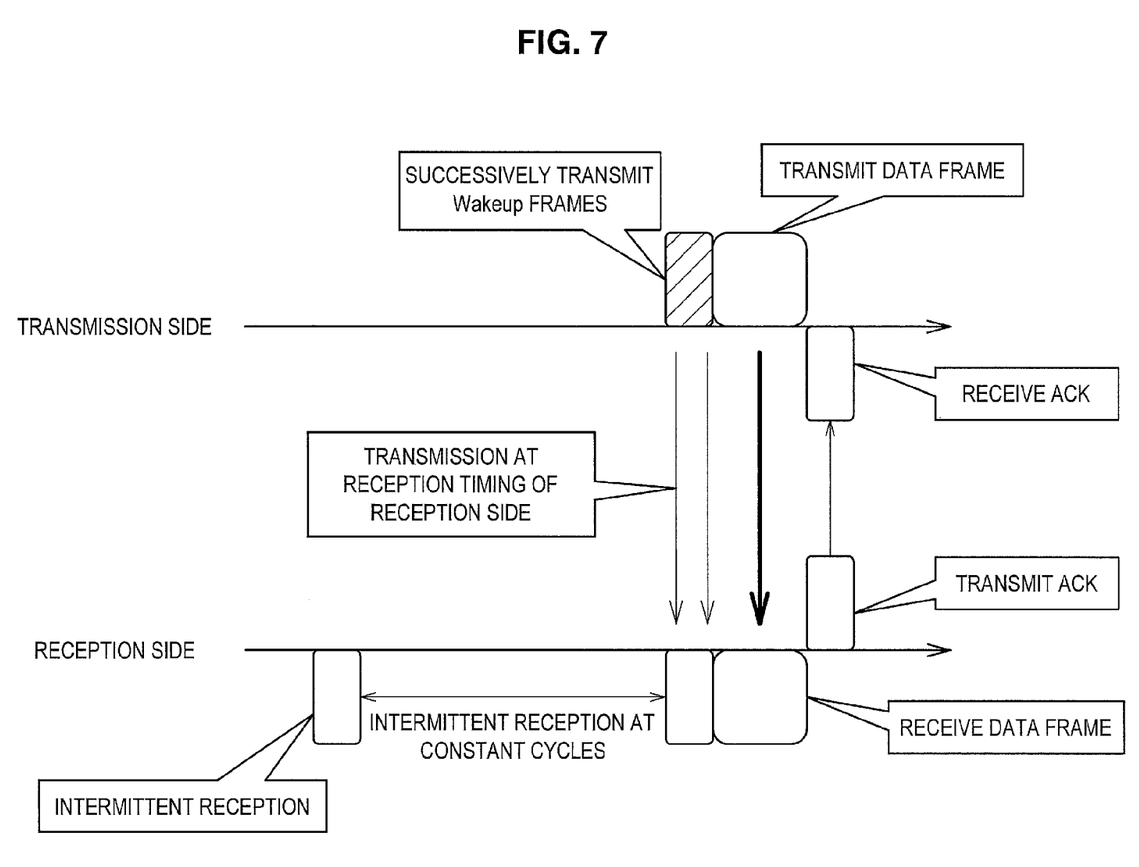
FIG. 7 is an explanatory diagram imaging communication with frame synchronous transmission.

FIG. 7 is an explanatory diagram imaging communication with the frame synchronous transmission.

If the frame asynchronous transmission is used, the transmission node S successively transmits wakeup frames for a short period before transmitting a data frame. The wakeup frame successive transmission period lasts as short as possible (e.g. 20 milliseconds).

Since the frame synchronous transmission has a short wakeup frame successive transmission period, overhead is low in frame transmission. However, the frame synchronous transmission has a higher probability than the frame asynchronous transmission that communication results in failure if the transmission node S falls out of synchronization with the reception node R.

The CSL standard stipulates that if no data frame arrives at a transmission destination while the frame synchronous transmission is performed (in other words, no reception response signal ACK is replied), retransmission is performed after backoff and carrier sense as in normal data communication.

If the transmission node S receives a reception response signal ACK from the reception node R and further transmits data frames with some frequency, the transmission node S rarely falls out of synchronization with the reception node R. This is because a reception response signal ACK includes intermittent reception timing information (more specifically, an intermittent reception cycle and a phase in reception of a data frame) on the reception node R in the CSL, and the transmission node S can compute the intermittent reception timing of the reception node R again on the basis of the information every time the transmission node S transmits a frame.

SUMMARY

However, if the transmission node S, which performs communication in the CSL, has not transmitted any frame for a long period (e.g. several hours or more), the transmission node S unfortunately falls out of synchronization with the reception node R. Individual differences in hardware and the usage of a software timer may cause the transmission node S to fall out of synchronization with the reception node R.

If the transmission node S falls out of synchronization with the reception node R, the transmission node S is incapable of transmitting a wakeup frame in the CSL synchronous communication at timing at which the reception node R reaches the reception standby state as illustrated in FIG. 7. In other words, the reception node R is incapable of receiving any wakeup frame. That is to say, the reception node R is not capable of being synchronized with the transmission node S or receiving any data frame from the transmission node S.

The CSL standard stipulates that "if no data frame arrives at a transmission destination or no reception response signal ACK is replied, a data frame is retransmitted as in normal data communication."

However, if the transmission node S is not synchronized or no wakeup frame arrives at the reception node R, it is not possible for the transmission node S to deliver a data frame with precision even by retransmitting the data frame alone thereafter because an accurate reception standby state of the reception node R is not known.

It is thus desired to provide a wireless communication device, a wireless communication program, and a wireless communication system that can enhance network efficiency even when two wireless communication devices fall out of synchronization with each other.

According to a first embodiment of the present invention, there is provided a wireless communication device that transmits a frame group including one or two or more types of frame at reception timing of a facing wireless communication device in response to a frame transmission request from an upper layer processing unit, the wireless communication device including (1) a reception timing sense means for sensing reception timing information on the facing wireless communication device, (2) a reception timing storage means for storing the reception timing information and disclosing and deleting the stored reception timing information, (3) a frame group arrival confirmation means for confirming that the transmitted frame group arrives at the facing wireless communication device, (4) a first frame group transmission means for transmitting the frame group when the wireless communication device is not synchronized with the facing wireless communication device, (5) a second frame group transmission means for transmitting the frame group when the wireless communication device is synchronized with the facing wireless communication device, (6) a third frame group transmission unit means for transmitting the frame group only when the frame group is retransmitted, and (7) a frame group transmission control means for selecting any of the first frame group transmission unit, the second frame group transmission unit, and the third frame group transmission unit on the basis of the reception timing information stored in the reception timing storage unit and a result of frame group arrival confirmation performed by the frame group arrival confirmation unit, and to control a frame group transmission operation.

According to a second embodiment of the present invention, there is provided a wireless communication program for causing a computer mounted on a wireless communication device that transmits a frame group including one or two or more types of frame at reception timing of a facing wireless communication device in response to a frame transmission request from an upper layer processing unit to function as (1) a reception timing sense means for sensing reception timing information on the facing wireless communication device, (2) a reception timing storage means for storing the reception timing information and disclosing and deleting the stored reception timing information, (3) a frame group arrival confirmation means for confirming that the transmitted frame group arrives at the facing wireless communication device, (4) a first frame group transmission means for transmitting the frame group when the wireless communication device is not synchronized with the facing wireless communication device, (5) a second frame group transmission means for transmitting the frame group when the wireless communication device is synchronized with the facing wireless communication device, (6) a third frame group transmission means for transmitting the frame group only when the frame group is retransmitted, and (7) a frame group transmission control means for selecting any of the first frame group transmission unit, the second frame group transmission unit, and the third frame group transmission unit on the basis of the reception timing information stored in the reception timing storage unit and a result of frame group arrival confirmation performed by the frame group arrival confirmation unit, and to control a frame group transmission operation.

According to a third embodiment of the present invention, there is provided a wireless communication system including a plurality of wireless communication devices. The wireless communication device according to the first embodiment of the present invention is applied as a wireless communication device that serves as a structural element of the wireless communication system.

According to the embodiments of the present invention described above, it is possible to enhance network efficiency even when two wireless communication devices fall out of synchronization with each other.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) First Embodiment

A wireless communication device, a wireless communication program, a wireless communication system according to a first embodiment of the present invention will be described below in detail with reference to the appended drawings.

(A-1) Configuration According to First Embodiment

Figure 1:
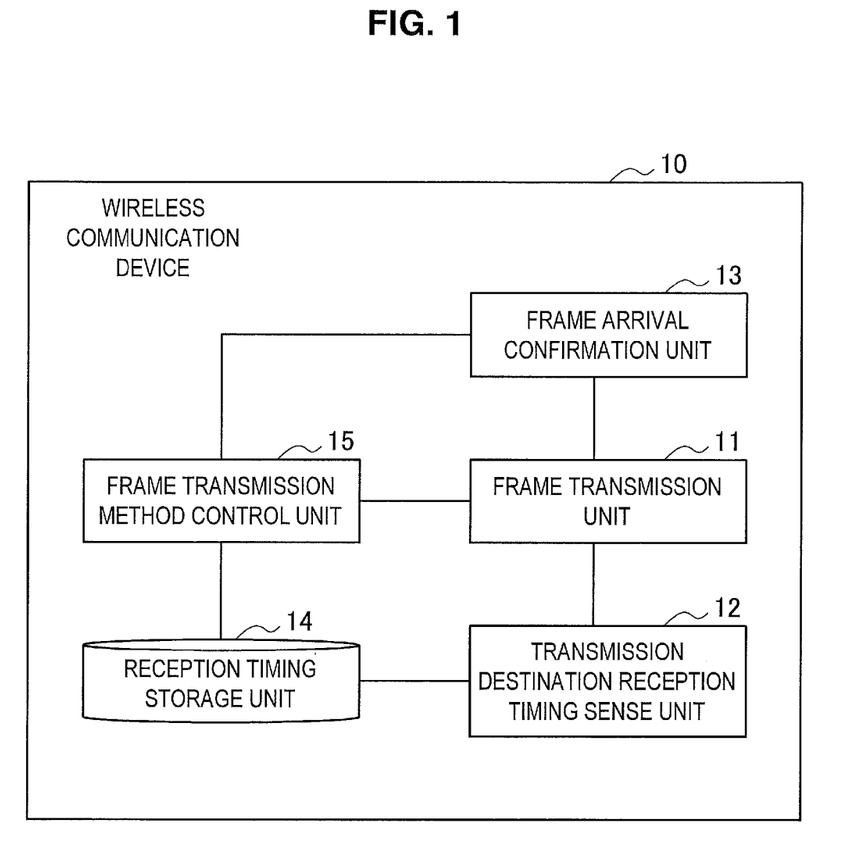
FIG. 1 is a block diagram illustrating a functional configuration of a wireless communication device according to a first embodiment.

FIG. 1 is a block diagram illustrating a functional configuration of a wireless communication device 10 according to the first embodiment.

FIG. 1 illustrates that the wireless communication device 10 includes a frame transmission unit 11, a transmission destination reception timing sense unit 12, a frame arrival confirmation unit 13, a reception timing storage unit 14, and a frame transmission method control unit 15.

The wireless communication device according to the first embodiment can also have units other than the frame transmission unit formed of hardware. In addition, the units can also be implemented by software (wireless communication program) to be executed by a CPU in combination with the CPU. Whichever implementation method is adopted, the function can be illustrated in FIG. 1.

The frame transmission unit 11 is connected to the frame transmission method control unit 15 and the frame arrival confirmation unit 13. The frame transmission unit 11 transmits a frame in a communication method for any of the frame asynchronous transmission and the frame synchronous transmission on the basis of an instruction from the frame transmission method control unit 15.

The transmission destination reception timing sense unit 12 is connected to the reception timing storage unit 14. The transmission destination reception timing sense unit 12 senses the reception timing of a reception node that is a transmission destination. In addition, the transmission destination reception timing sense unit 12 stores the sensed reception timing in the reception timing storage unit 14. The transmission destination reception timing sense unit 12 can adopt, for example, a technique of analyzing reception timing information written in a reception response signal ACK and setting the reception timing as the reception timing of a transmission destination as a technique of sensing reception timing. The transmission destination reception timing sense unit 12 may further use, as the reception timing of a transmission destination, the time at which a reception response signal ACK is received.

The frame arrival confirmation unit 13 is connected to the frame transmission unit 11 and the frame transmission method control unit 15. The frame arrival confirmation unit 13 confirms the arrival of a frame and notifies the frame transmission method control unit 15 of a result of the frame arrival confirmation. Examples of specific frame arrival confirmation methods include the frame arrival confirmation unit 13 confirming reception of a reception response signal ACK corresponding to a transmitted frame.

The reception timing storage unit 14 is connected to the transmission destination reception timing sense unit 12 and the frame transmission method control unit 15. The reception timing storage unit 14 stores, in pairs, reception timing sensed by the transmission destination reception timing sense unit 12 and information on a reception node that is a transmission destination. The information stored in the reception timing storage unit 14 is disclosed and deleted at the demand of the frame transmission method control unit 15.

The frame transmission method control unit 15 is connected to the frame transmission unit 11, the frame arrival confirmation unit 13, and the reception timing storage unit 14. The frame transmission method control unit 15 exerts control to acquire reception timing information from the reception timing storage unit 14. In addition, the frame transmission method control unit 15 exerts control to decide which of the synchronous transmission and the asynchronous transmission is used for transmission of a frame to the frame transmission unit 11. Moreover, the frame transmission method control unit 15 exerts control to acquire frame arrival confirmation information from the frame arrival confirmation unit 13.

Although it is not illustrated, the wireless communication system according to the first embodiment is obtained by disposing a plurality of wireless communication devices including the wireless communication device 10 configured as illustrated in FIG. 1. A single wireless communication device 10 among them wirelessly communicates with another wireless communication device.

(A-2) Operation According to First Embodiment

Next, an operation of the wireless communication device 10 according to the first embodiment chiefly for transmission will be described with reference to the appended drawings. A wireless communication device will be referred to as "node" as necessary in the following description.

A frame reception operation of a wireless communication device on the reception side which is a transmission destination is the same as a frame reception operation of the conventional (technology described in IEEE802.15.4e) wireless communication device, so that the description will be omitted.

Figure 2:
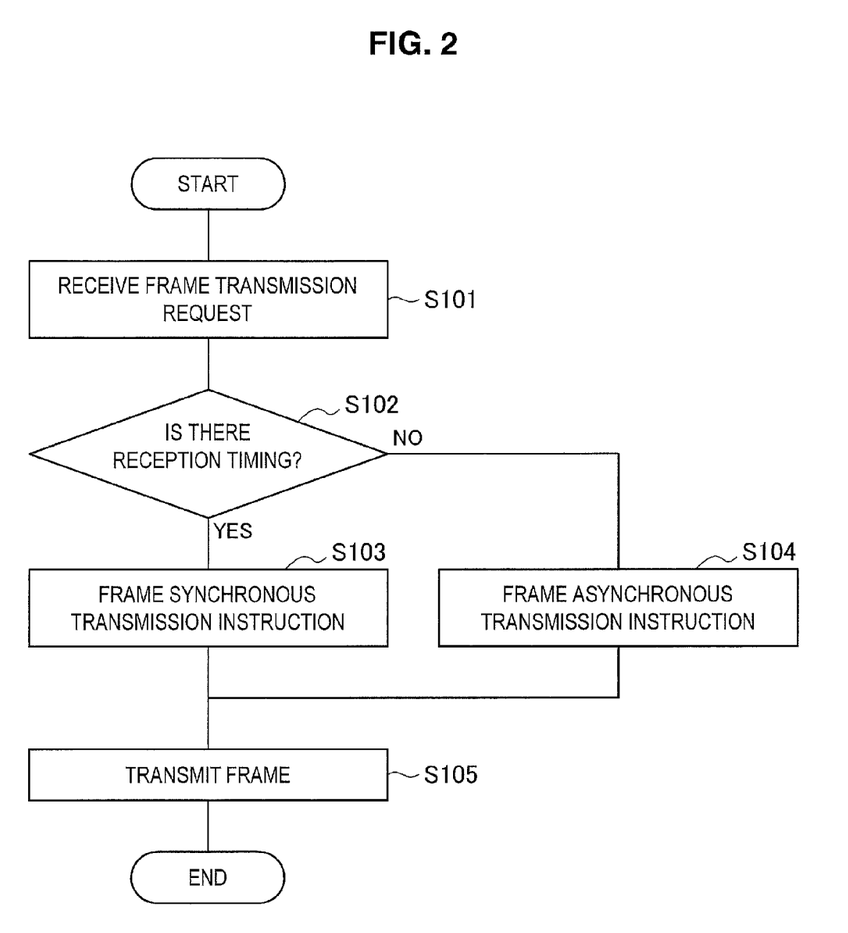
FIG. 2 is a flowchart illustrating a frame transmission operation of the wireless communication device according to the first embodiment.

FIG. 2 is a flowchart illustrating a frame transmission operation of the wireless communication device 10.

If the frame transmission method control unit 15 receives a frame transmission request from an upper layer not illustrated, the frame transmission method control unit 15 accesses the reception timing storage unit 14 and examines whether or not the reception timing of a transmission destination is present (S101 and S102).

If a result of the examination shows that the reception timing information on the transmission destination is stored in the reception timing storage unit 14, the frame transmission method control unit 15 notifies the frame transmission unit 11 of the use of the frame synchronous transmission, which uses the reception timing as a frame transmission method (S103).

If a result of the examination shows that the reception timing information is not stored in the reception timing storage unit 14, the frame transmission method control unit 15 notifies the frame transmission unit 11 of the use of the frame asynchronous transmission (S104).

The frame transmission unit 11 transmits a frame with any of the frame synchronous transmission and the frame asynchronous transmission, of which the frame transmission method control unit 15 has notified the frame transmission unit 11 (S105).

Next, a retransmission operation of the wireless communication device 10 which is performed after a frame is transmitted with the frame synchronous transmission will be described.

Figure 3:
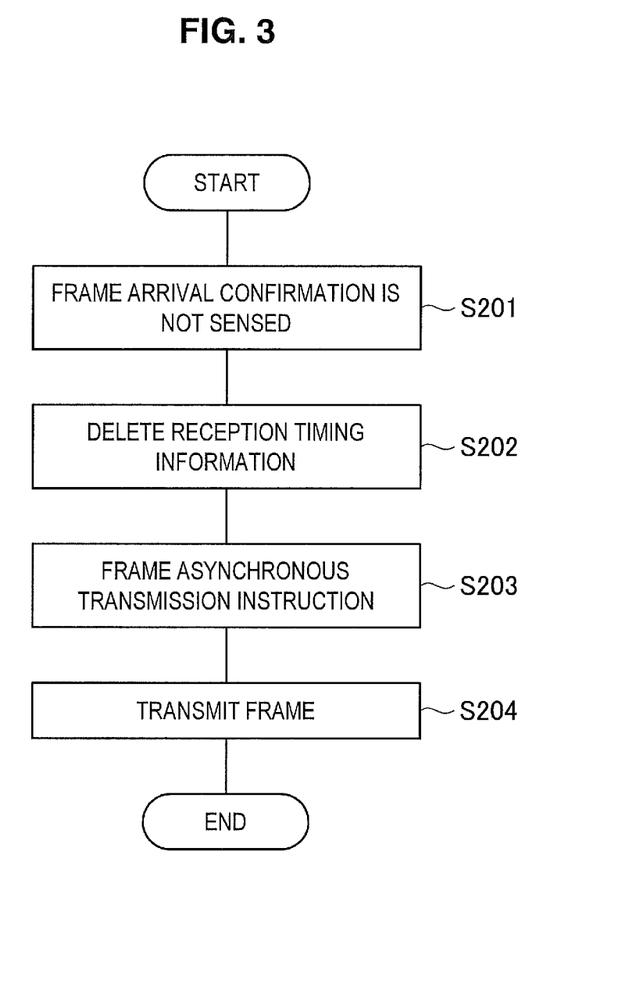
FIG. 3 is a flowchart illustrating a frame transmission operation (retransmission) of the wireless communication device according to the first embodiment.

FIG. 3 is a flowchart illustrating a frame transmission operation (retransmission) of a wireless communication device.

The frame arrival confirmation unit 13 senses that the frame arrival confirmation is not possible (S201). For example, reception of no reception response signal ACK from a transmission destination serves as means for sensing that frame arrival confirmation is not possible, the reception response signal ACK corresponding to a frame transmitted within a given time. If the frame arrival confirmation unit 13 senses that frame arrival confirmation is not possible, the frame transmission method control unit 15 determines that a transmission destination falls out of synchronization.

The frame arrival confirmation unit 13 deletes reception timing information on a transmission destination which is stored in the reception timing storage unit 14 (S202).

Furthermore, the frame transmission method control unit 15 instructs the frame transmission unit 11 to retransmit a frame with the frame asynchronous transmission (S203).

The frame transmission unit 11 retransmits a frame with the frame asynchronous transmission (S204).

(A-3) Advantageous Effects of First Embodiment

According to the first embodiment, the following advantageous effects can be attained.

According to the first embodiment, a transmission node deletes synchronization information on a transmission destination which is stored in the reception timing storage unit 14, and performs the frame asynchronous transmission when the frame synchronous transmission results in failure (the transmission node falls out of synchronization). Accordingly, it becomes possible to deliver a frame to a reception node that is not synchronized.

Meanwhile, according to a second embodiment, a transmission node can communicate with a reception node. It is thus possible for the transmission destination reception timing sense unit 12 to sense the reception timing of a transmission destination again and to store the sensed content in the reception timing storage unit 14. Thereafter, the transmission node can perform the CSL synchronous communication again with the reception node, thereby allowing the efficiency of the communication network to be enhanced.

(B) Second Embodiment

Next, a wireless communication device, a wireless communication program, and a wireless communication system according to the second embodiment of the present invention will be described with reference to the appended drawings.

(B-1) Configuration According to Second Embodiment

Figure 4:
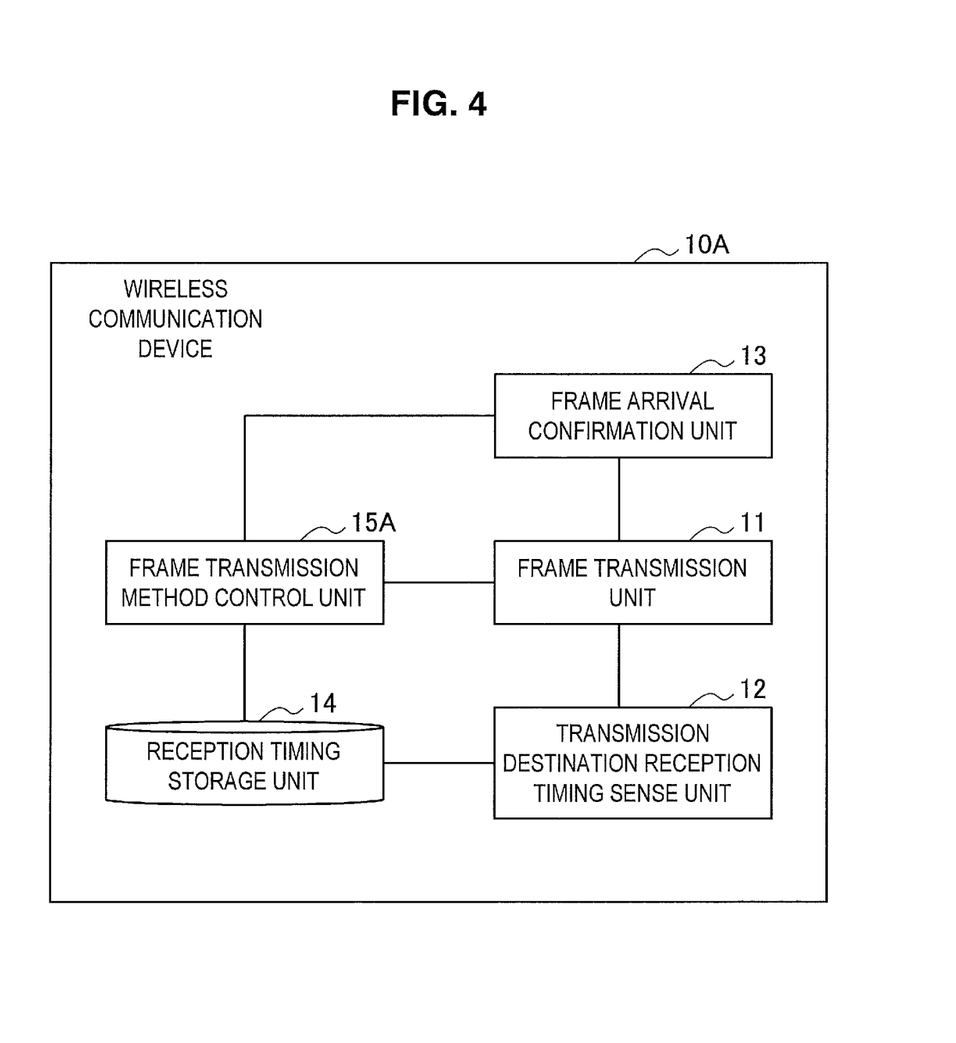
FIG. 4 is a block diagram illustrating a functional configuration of a wireless communication device according to a second embodiment.

FIG. 4 is a block diagram illustrating a functional configuration of the wireless communication device according to the second embodiment, and units that are the same as the units in FIG. 1 in the first embodiment or correspond to the units in FIG. 1 in the first embodiment are denoted with the same or corresponding reference numerals.

FIG. 4 illustrates that a wireless communication device 10A according to the second embodiment includes a frame transmission unit 11, a transmission destination reception timing sense unit 12, a frame arrival confirmation unit 13, a reception timing storage unit 14, and a frame transmission method control unit 15A.

Different from the wireless communication device 10 according to the first embodiment, the wireless communication device 10A according to the second embodiment does not include the frame transmission method control unit 15, but includes the frame transmission method control unit 15A instead as its structural element.

The frame transmission method control unit 15A is basically the same as the frame transmission method control unit 15. However, when the frame synchronous transmission results in failure, the frame transmission method control unit 15A does not perform retransmission, but notifies an upper layer not illustrated of the failure.

(B-2) Operation According to Second Embodiment

Next, an operation of the wireless communication device 10A according to the second embodiment will be described.

As in first embodiment, a transmission operation of the wireless communication device 10A according to the second embodiment is performed in accordance with the flowchart of FIG. 2.

Next, a retransmission operation of the wireless communication device 10 which is performed after a frame is transmitted with the frame synchronous transmission will be described.

Figure 5:
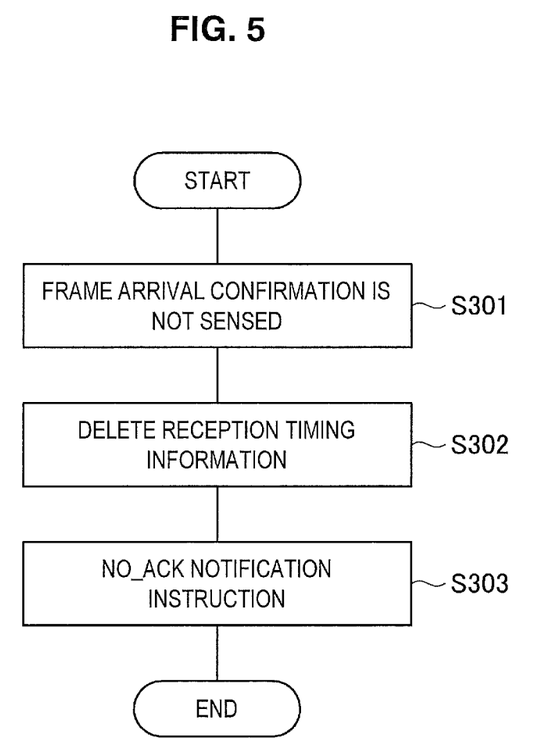
FIG. 5 is a flowchart illustrating a frame transmission operation (retransmission) of the wireless communication device according to the second embodiment.

FIG. 5 is a flowchart illustrating a frame transmission operation (retransmission) of the wireless communication device 10A.

The processes in step S301 and step S302 are the same as the processes in step S201 and step S202 discussed above, so that the description will be omitted. Next, the following process in step S303 will be described.

The frame transmission method control unit 15A exerts control to notify an upper layer that frame transmission results in failure (NO_ACK) (S303).

After notifying the upper layer of NO_ACK, the wireless communication device 10A finishes the process.

(B-3) Advantageous Effects of Second Embodiment

According to the second embodiment, the following advantageous effects can be attained.

According to the second embodiment, when the frame synchronous transmission results in failure (a transmission node falls out of synchronization), the transmission node does not retransmit a data frame, but notifies an upper layer of the failure in the transmission instead, deletes synchronization information on a transmission destination which is stored in the reception timing storage unit 14, and finishes the process. Accordingly, it is possible to prevent a frame from being transmitted (retransmitted) in vain to a node that is not synchronized.

According to the second embodiment, it is possible to decrease effects on the surroundings and the upper layer even when the synchronous transmission results in failure. Thus, it becomes possible to enhance network efficiency.

(C) Other Embodiments

In addition to each of the embodiments described above, modified examples below are also possible.

(C-1) An example of the CSL is described as a power-saving communication method in each of the embodiments above. However, when a short preamble MAC protocol for duty-cycled wireless sensor networks (X-MAC) is used, the present invention is also applicable.

(C-2) When the frame synchronous transmission results in failure, retransmission is performed with the frame asynchronous transmission in the first embodiment. However, a wakeup frame transmission period does not have to be extended as much as a wakeup frame transmission period for the frame asynchronous transmission, but the wakeup frame transmission period may be extended a little (e.g. several times as long as a wakeup frame transmission period for the frame synchronous transmission) and transmission may be performed. This allows overhead to be lowered and allows retransmission to be performed with power-saving communication.

Note that the wireless communication method of the embodiments described above can be configured by software. In the case of configuring by software, the program that implements at least part of the sound collection and reproduction method may be stored in a non-transitory computer readable medium, such as a flexible disk or a CD-ROM, and may be loaded onto a computer and executed. The recording medium is not limited to a removable recording medium such as a magnetic disk or an optical disk, and may be a fixed recording medium such as a hard disk apparatus or a memory. In addition, the program that implements at least part of the a wireless communication method may be distributed through a communication line (also including wireless communication) such as the Internet. Furthermore, the program may be encrypted or modulated or compressed, and the resulting program may be distributed through a wired or wireless line such as the Internet, or may be stored a non-transitory computer readable medium and distributed.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A wireless communication device that transmits a frame group including one or two or more types of frame at reception timing of a facing wireless communication device in response to a frame transmission request from an upper layer processing unit, and that operates according to a coordinated sampled listening (CSL) standard, the wireless communication device comprising:

a processor, and
a non-transitory storage medium containing program instructions, execution of which by the processor causes the wireless communication device to provide functions of
a reception timing sense unit configured to sense reception timing information on the facing wireless communication device;

a reception timing storage unit configured to store the reception timing information and to disclose and delete the stored reception timing information;

a frame group arrival confirmation unit configured to confirm that a transmitted frame group arrives at the facing wireless communication device;

a frame transmission unit configured to transmit the frame group; and a frame group transmission control unit configured to upon receiving the frame transmission request from the upper layer processing unit, access the reception timing storage unit to determine whether or not the reception timing information is present, upon determining that the reception timing information is stored in the reception timing storage unit, control the frame transmission unit to transmit the frame group with synchronous transmission to the facing wireless communication device, and to retransmit the frame group with asynchronous transmission if the frame group arrival confirmation unit fails to confirm that the transmitted frame group has arrived at the facing wireless communication device, and upon determining that the reception timing information is not stored in the reception timing storage unit, control the frame transmission unit to transmit the frame group with asynchronous transmission.

2. The wireless communication device according to claim 1, wherein, when the frame group arrival confirmation unit fails to confirm the arrival of the frame group transmitted with the synchronous transmission by the frame transmission unit, the frame group transmission control unit causes the frame transmission unit to retransmit the frame group with the asynchronous transmission after the reception timing storage unit deletes reception timing information on the facing wireless communication device.

3. The wireless communication device according to claim 1, wherein, when the frame group arrival confirmation unit fails to confirm the arrival of the frame group transmitted with the synchronous transmission by the frame transmission unit, the frame group transmission control unit notifies the upper layer processing unit of failure in transmission after the reception timing storage unit deletes reception timing information on the facing wireless communication device.

4. The wireless communication device according to claim 1, wherein, when the frame group arrival confirmation unit fails to confirm the arrival of the frame group transmitted with the synchronous transmission by the frame transmission unit successively a plurality of times within a range that does not exceed a given number, the frame group transmission control unit notifies the upper layer processing unit of failure in transmission, and when the frame group arrival confirmation unit fails to confirm the arrival the given number of times, the frame group transmission control unit notifies the upper layer processing unit of failure in transmission after the reception timing storage unit deletes reception timing of the facing wireless communication device.

5. The wireless communication device according to claim 1, wherein the frame group arrival confirmation unit confirms arrival of a frame group by receiving a reception response signal transmitted from the facing wireless communication device, wherein the reception timing sense unit analyzes the reception response signal and senses reception timing included in the reception response signal, wherein the frame transmission unit transmits a data frame after successively transmitting wakeup frames for a first period or longer when the asynchronous transmission is used, wherein the frame transmission unit transmits a data frame after successively transmitting the wakeup frames for a second period or longer when the synchronous transmission is used, and wherein the frame transmission unit transmits a data frame after successively transmitting wakeup frames for a third period or longer when the retransmission is performed.

6. The wireless communication device according to claim 1, wherein the frame group arrival confirmation unit confirms arrival of a frame group by receiving a reception response signal transmitted from the facing wireless communication device, wherein the reception timing sense unit senses, as the reception timing information, time obtained by subtracting a period for which a frame group is transmitted from time at which the reception response signal is received, wherein the frame transmission unit places an interval for each transmission frame at least for receiving the reception response signal, and successively transmits data frames for a first period or longer when the asynchronous transmission is used, wherein the frame transmission unit places an interval for each transmission frame at least for receiving the reception response signal, and successively transmits data frames for a second period or longer when the synchronous transmission is used, and wherein the frame transmission unit places an interval for each transmission frame at least for receiving the reception response signal, and successively transmits data frames for a third period or longer when the retransmission is performed.

7. The wireless communication device according to claim 5, wherein the second period is shorter than the first period.

8. The wireless communication device according to claim 5, wherein the third period is shorter than the first period and longer than the second period.

9. A non-transitory computer-readable recording medium containing wireless communication program instructions, execution of which by a processor causes a wireless communication device to transmit a frame group including one or two or more types of frame at reception timing of a facing wireless communication device in response to a frame transmission request from an upper layer processing unit and to operate according to a coordinated sampled listening (CSL) standard, the wireless communication program instructions comprising:

instructions to implement, by the processor, a reception timing sense unit configured to sense reception timing information on the facing wireless communication device;

instructions to implement, by the processor, a reception timing storage unit configured to store the reception timing information and to disclose and delete the stored reception timing information;

instructions to implement, by the processor, a frame group arrival confirmation unit configured to confirm that a transmitted frame group arrives at the facing wireless communication device;

instructions to implement, by the processor, a frame transmission unit configured to transmit the frame group; and instructions to implement, by the processor, a frame group transmission control unit configured to upon receiving the frame transmission request from the upper layer processing unit, access the reception timing storage unit to determine whether or not the reception timing information is present, upon determining that the reception timing information is stored in the reception timing storage unit, control the frame transmission unit to transmit the frame group with synchronous transmission to the facing wireless communication device, and to retransmit the frame group with asynchronous transmission if the frame group arrival confirmation unit fails to confirm that the transmitted frame group has arrived at the facing wireless communication device, and upon determining that the reception timing information is not stored in the reception timing storage unit, control the frame transmission unit to transmit the frame group with asynchronous transmission.

10. A wireless communication system comprising:

a plurality of wireless communication devices, wherein the wireless communication device according to claim 1 is applied as a wireless communication device that serves as a structural element of the wireless communication system.

* * * * *